(12) United States Patent
Kagami et al.

(10) Patent No.: US 6,535,348 B1
(45) Date of Patent: Mar. 18, 2003

(54) SERVO CONTROL METHOD AND INFORMATION STORAGE DEVICE

(75) Inventors: Yoshiyuki Kagami, Kawasaki (JP); Tatsuhiko Kosugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/413,649

(22) Filed: Oct. 6, 1999

(30) Foreign Application Priority Data

Nov. 30, 1998 (JP) ............................................. 10-340556

(51) Int. Cl.$^7$ ............................................... G11B 5/596
(52) U.S. Cl. ................................. 360/78.08; 360/77.08
(58) Field of Search ............................. 360/44, 77.08, 360/75, 78.08

(56) References Cited

U.S. PATENT DOCUMENTS

| | | | | |
|---|---|---|---|---|
| 4,490,756 A | * 12/1984 | Dost et al. | ................ | 360/77.08 |
| 4,549,232 A | 10/1985 | Axmear et al. | ................ | 360/77 |
| 5,343,340 A | * 8/1994 | Boutaghou et al. | ...... | 360/77.08 |
| 5,523,900 A | 6/1996 | Kosugi et al. | ........... | 360/77.05 |
| 5,694,265 A | 12/1997 | Kosugi et al. | ........... | 360/77.05 |
| 5,757,576 A | 5/1998 | Kosugi | .................... | 360/78.14 |
| 5,892,634 A | * 4/1999 | Ito et al. | .................. | 360/77.08 |
| 6,172,836 B1 | * 1/2001 | Bang | ........................... | 360/75 |

FOREIGN PATENT DOCUMENTS

| | | |
|---|---|---|
| EP | 034938 | 9/1981 |
| EP | 87013697 | 1/1987 |
| GB | 1127563 | 9/1968 |
| JP | 6010472 | 1/1985 |
| JP | 6243574 | 9/1994 |
| JP | 7287949 | 10/1995 |
| JP | 7334948 | 12/1995 |
| JP | 9180386 | 7/1997 |

OTHER PUBLICATIONS

IBM Technical Disclosure Bulletin, vol. 29 no. 8 (1987) pp. 3697–3699 "Disk File Phase–Encoded Sector Servo Pattern With Data And Reference Fields In Each Sector".

* cited by examiner

*Primary Examiner*—David Hudspeth
*Assistant Examiner*—K. Wong
(74) *Attorney, Agent, or Firm*—Greer, Burns & Crain, Ltd.

(57) ABSTRACT

A servo control method and an information storage device are provided. In the method and device, positional information is detected in accordance with servo information including a plurality of positional regions having phase differences between tracks. The positional regions consist of a first positional region in which the phase difference between tracks is +90°, a second positional region in which the phase difference between tracks is –90°, a third positional region in which the phase difference between tracks is +90°, and a fourth positional region in which the phase difference between tracks is –135°. A deviation from a reference track is detected from the phase difference between the vector of a reproduction signal of the second positional region and the vector of a reproduction signal of the fourth positional region. Thus, a wide range of deviation can be detected.

12 Claims, 10 Drawing Sheets

| | ∠$e_1$ | ∠$o_1$ | ∠$e_2$ | ∠$o_2$ | ∠$o_1$−∠$o_2$ |
|---|---|---|---|---|---|
| Tr 0 | 0 | 0 | 0 | 0 | 0 |
| Tr 1 | +90 | −90 | +90 | −135 | +45 |
| Tr 2 | +180 | −180 | +180 | −270 | +90 |
| Tr 3 | +270 | −270 | +270 | −405(−45) | +135 |
| Tr 4 | +360(0) | −360(0) | +360(0) | −540(−180) | +180(−180) |
| Tr 5 | +450(90) | −450(−90) | +450(90) | −675(−315/+45) | −135 |
| Tr 6 | +540(180) | −540(−180) | +540(180) | −810(−90) | −90 |
| Tr 7 | +630(270) | −630(−270) | +630(270) | −945(−275/+135) | −45 |
| Tr 8 | +720(0) | −720(0) | +720(0) | −1080(0) | 0 |

| | $\Delta e_1$ | $\Delta o_1$ | $\Delta e_2$ | Pos |
|---|---|---|---|---|
| Tr 0 | 0 | 0 | 0 | 0 |
| Tr 1 | +90 | −90 | +90 | +180 |
| Tr 2 | +180 | −180 | +180 | 0 |
| Tr 3 | +270 | −270 | +270 | 180 |
| Tr 4 | +360 (0) | −360 (0) | +360 (0) | 0 |
| Tr 5 | | | | 180 |
| Tr 6 | | | | 0 |
| Tr 7 | | | | 180 |
| Tr 8 | | | | ... |

| | ∠e1 | ∠o1 | ∠e2 | ∠o2 | ∠o1−∠o2 |
|---|---|---|---|---|---|
| Tr 0 | 0 | 0 | 0 | 0 | 0 |
| Tr 1 | +90 | −90 | +90 | −135 | +45 |
| Tr 2 | +180 | −180 | +180 | −270 | +90 |
| Tr 3 | +270 | −270 | +270 | −405(−45) | +135 |
| Tr 4 | +360(0) | −360(0) | +360(0) | −540(−180) | +180(−180) |
| Tr 5 | +450(90) | −450(−90) | +450(90) | −675(−315)(+45) | −135 |
| Tr 6 | +540(180) | −540(−180) | +540(180) | −810(−90) | −90 |
| Tr 7 | +630(270) | −630(−270) | +630(270) | −945(−275)(+135) | −45 |
| Tr 8 | +720(0) | −720(0) | +720(0) | −1080(0) | 0 |

FIG. 11

SERVO CONTROL METHOD AND INFORMATION STORAGE DEVICE

BACKGROUND OF THE INVENTION

1. Field of the Invention

The present invention generally relates to a servo control method and an information storage device, and, more particularly, to a servo control method and an information storage device in which positional information is detected in accordance with servo information including a plurality of positional regions having different phases.

Based on the servo information stored on a magnetic disk in advance, a magnetic disk device detects displacement of a scanning head, so that tracking control can be controlled to perform information reproduction in a desired position.

2. Description of the Related Art

Figure 1:
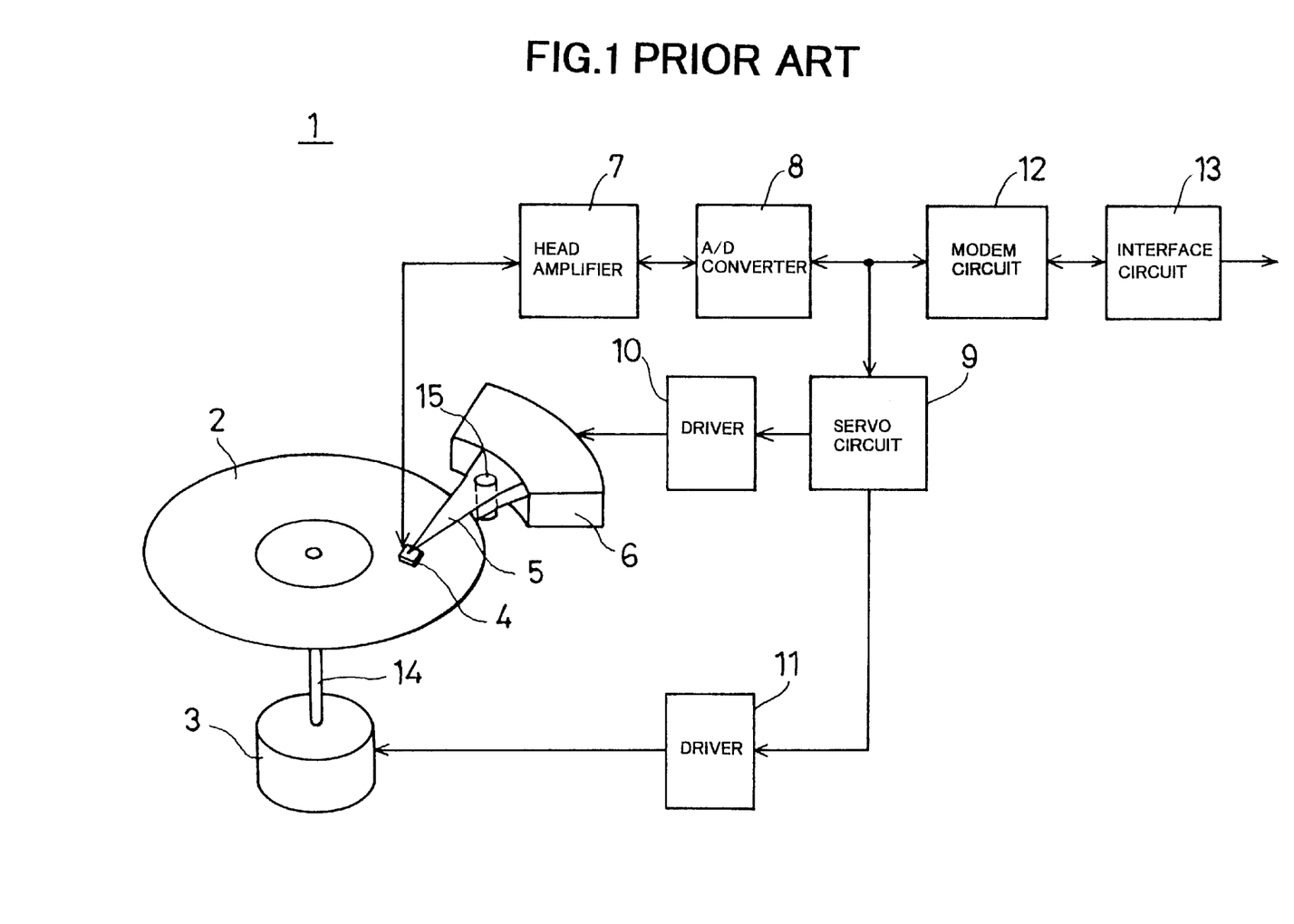
FIG. 1 illustrates a conventional magnetic disk device.

FIG. 1 is a block diagram of a conventional magnetic disk device.

The conventional magnetic disk device 1 comprises a magnetic disk 2, a spindle motor 3, a magnetic head 4, a head arm 5, a voice coil motor (VCM) 6, a head amplifier 7, an A/D converter 8, a servo circuit 9, drivers 10 and 11, a modem circuit 12, and an interface circuit 13.

The magnetic disk 2 is secured by a rotation axis 14 of the spindle motor 3, and is rotated by the spindle motor 3. The magnetic head 4 faces the magnetic disk 2. The magnetic head 4 magnetizes the magnetic disk 2 in accordance with a recording signal supplied from the head amplifier 7, thereby recording information.

The magnetic head 4 also outputs an electric current in accordance with a variation in magnetization of the magnetic disk 2, thereby outputting a reproduction signal. The magnetic head 4 is secured at an edge of the head arm 5.

The other edge of the head arm 5 is connected to the VCM 6 via a rotation axis 15. The VCM 6 oscillates the head arm 5 in the radial direction of the magnetic disk 2. As the head arm 5 is oscillated by the VCM 6, the magnetic head 4 is moved in the radial direction of the magnetic disk 2 so as to trace a desired track on the magnetic disk 2.

The magnetic head 4 is connected to the head amplifier 7. The head amplifier 7 amplifies a recording signal supplied from the, A/D converter 8, and sends the amplified recording signal to the magnetic head 4. The head amplifier 7 also amplifies a reproduction signal detected by the magnetic head 4, and sends the amplified reproduction signal to the A/D converter 8.

The A/D converter 8 converts the recording signal supplied from the modem circuit 12 into an analog signal, and sends it to the head amplifier 7. The A/D converter 8 also converts the reproduction signal amplified by the head amplifier 7 into a digital signal.

The modem circuit 12 modulates information supplied from the interface circuit 13, and sends it as the recording signal to the A/D converter 8. The modem circuit 12 also demodulates the reproduction signal supplied from the A/D converter 8 into the original information. The interface circuit 13 exchanges signals with another device connected to the magnetic disk device 1.

The servo circuit 9 receives the reproduction signal from the A/D converter 8, and detects the positional difference between the magnetic head 4 and the desired track in accordance with servo information contained in the reproduction signal. The servo circuit 9 then generates a servo control signal in accordance with the positional difference, and sends the servo control signal to the driver 10. The driver 10 controls the VCM 6 in accordance with the servo control signal transmitted from the servo circuit 9. The servo circuit 9 also controls the spindle motor 3 through the driver 11.

The servo information to be detected by the servo circuit 9 is recorded on the magnetic disk 2 in advance.

Figure 2:
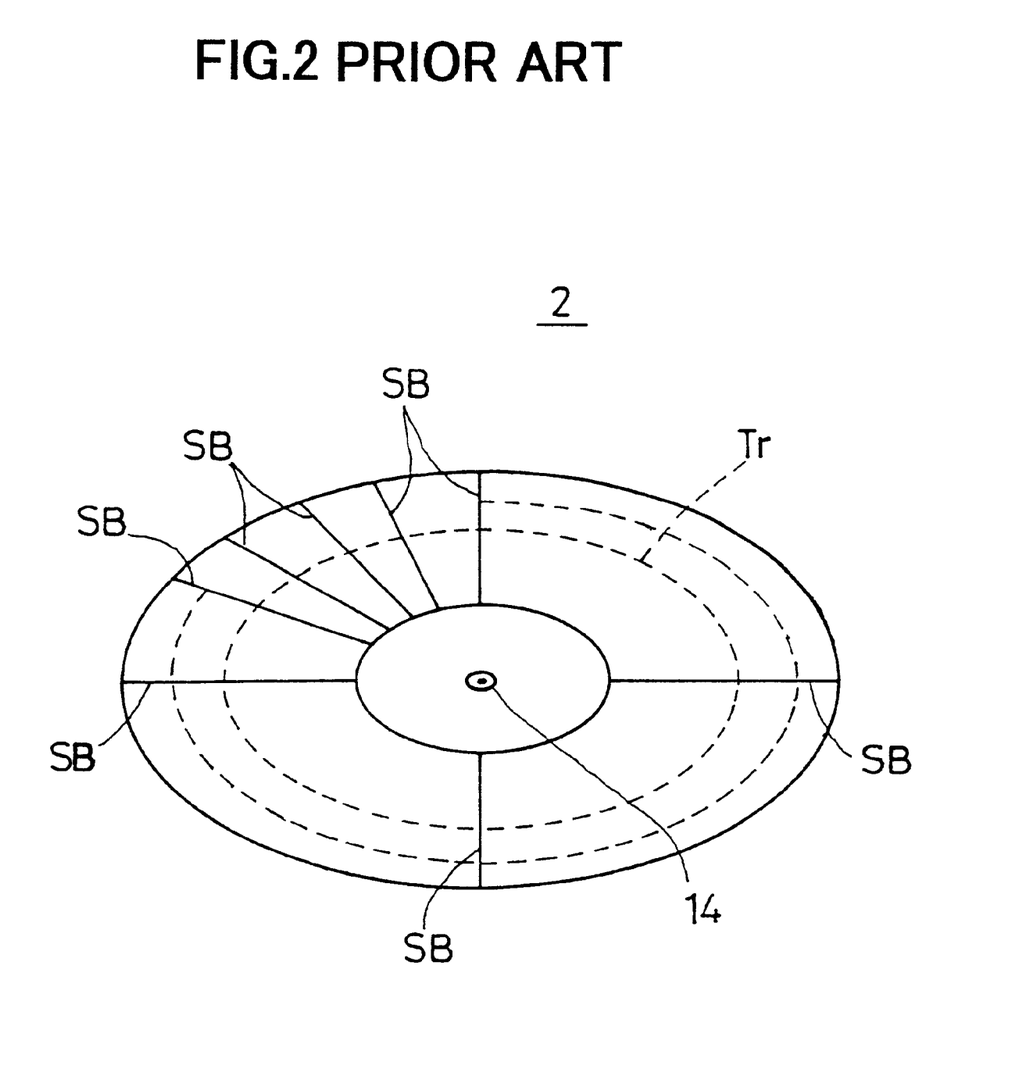
FIG. 2 shows a conventional magnetic disk format.

FIG. 2 shows a format of the conventional magnetic disk 2.

On the magnetic disk 2, pieces of servo information SB are formed radially from the rotation axis 14 of the spindle motor 3. Data is recorded between the pieces of servo information SB. Tracks Tr are formed concentrically with the rotation axis 14 of the spindle motor 3.

Figure 3:
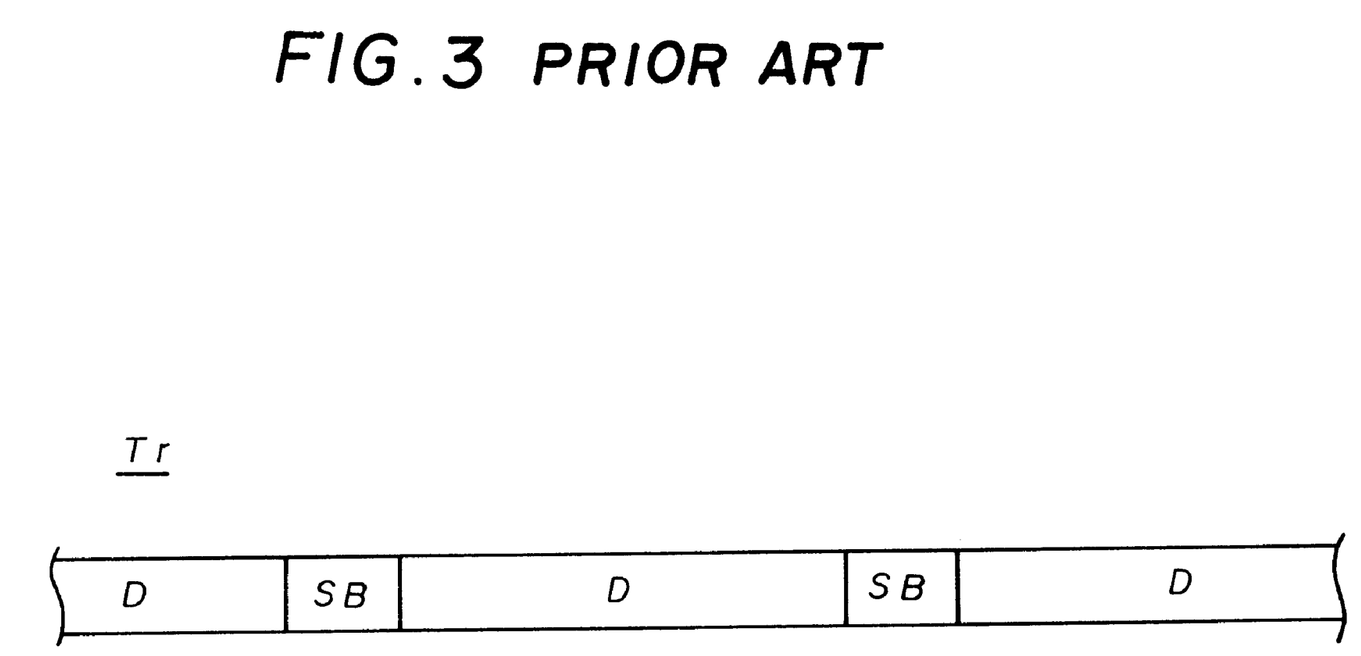
FIG. 3 shows a conventional track format.

FIG. 3 shows a track format.

The servo information SB and a data region D alternately appear on each of the tracks Tr, as shown in FIG. 3. Sixty to eighty pieces of servo information SB are arranged on each of the tracks Tr.

FIGS. 4A to 4E show a servo information format.

Figure 4A:
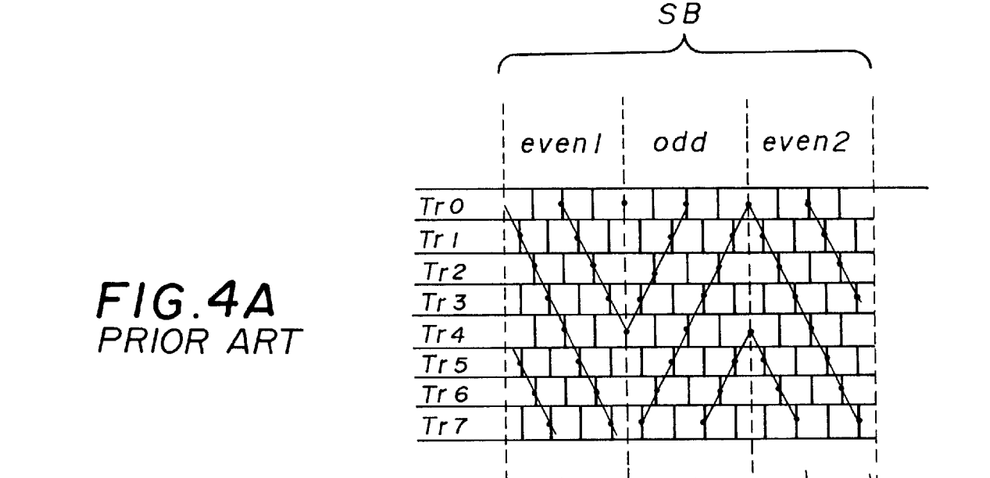
FIGS. 4A to 4E show a conventional servo information format.
Figures 4B, 4C:
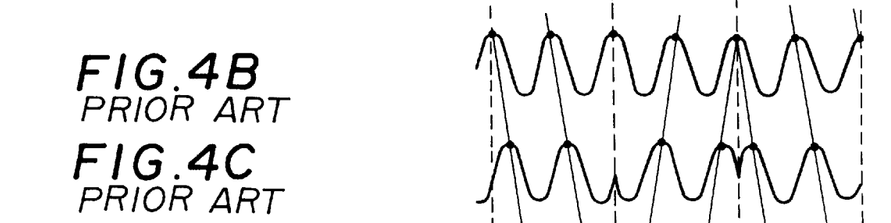
Figure 4D:
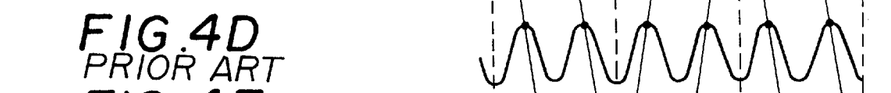
Figure 4E:
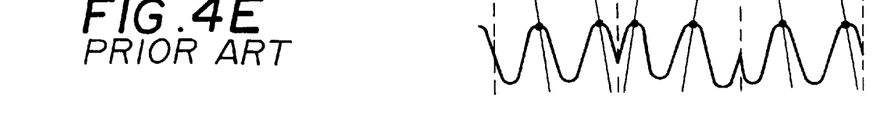

FIG. 4A shows a pattern of the servo information SB, and FIGS. 4B to 4E show reproduction signal waveforms of the tracks Tr0 to Tr3.

The servo information SB consists of three positional regions "even1", "odd1", and "even2".

In the positional region "even1", if the phase of the signal pattern is set at 0° on the track Tr0, the phase is +90° on the track Tr1, +180° on the track Tr2, and +270° on the track Tr3. The phase is back at 0° on the track Tr4.

In the positional region "odd1", if the phase of the signal pattern is set at 0° on the track Tr0, the phase is −90° on the track Tr1, −180° on the track Tr2, and −270° on the track Tr3. The phase is back at 0° on the track Tr4.

In the positional region "even2", if the phase of the signal pattern is set at 0° on the track Tr0, the phase is +90° on the track Tr1, +180° on the track Tr2, and +270° on the track Tr3. The phase is back at 0° on the track Tr4.

As a result, the tracks Tr can be identified in accordance with the phase difference in the positional regions "even1", "odd1", and "even2".

Figure 5:
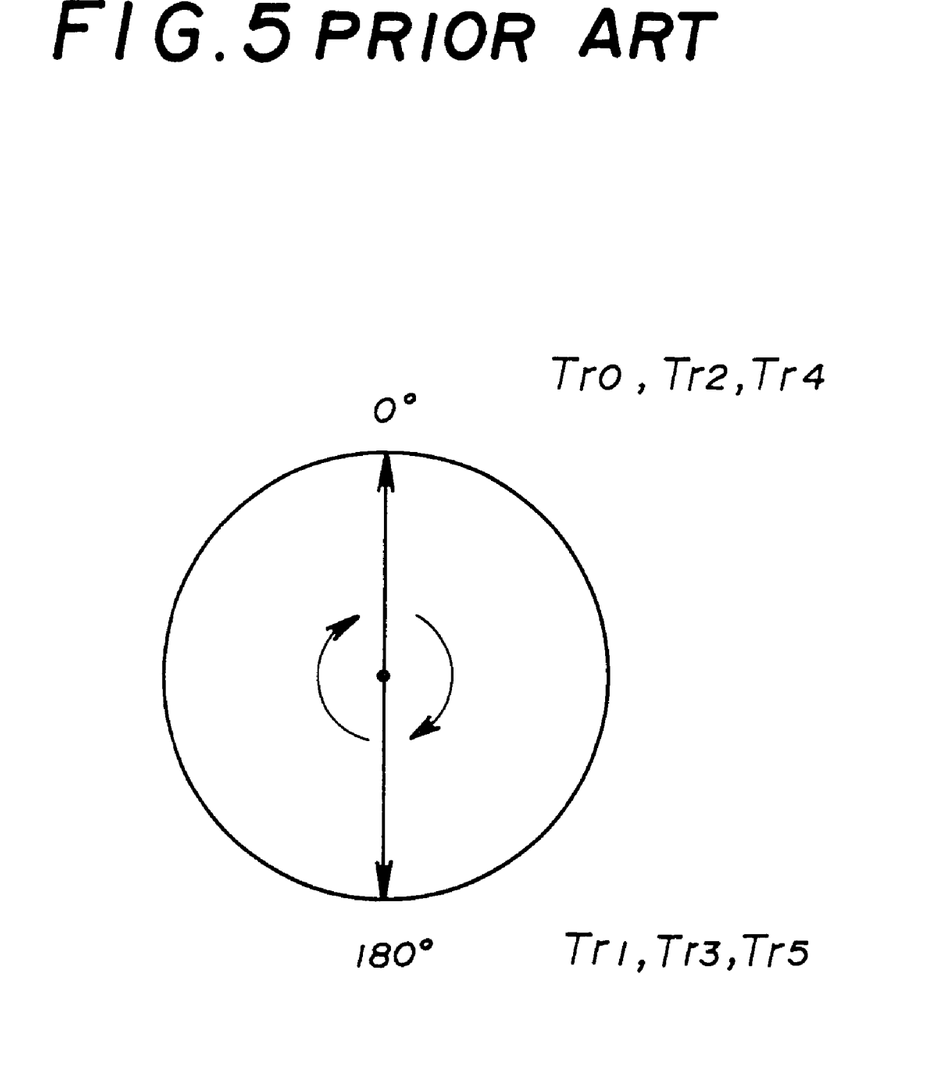
FIG. 5 shows an operation of the conventional magnetic disk device.

FIG. 5 shows an operation of the conventional magnetic disk device. As shown in FIG. 5, when the detected phase difference of the positional regions "even1", "odd1", and "even2" is 0°, the tracks Tr0, Tr2, and Tr4 can be identified. When the detected phase difference of the positional regions "even1", "odd1", and "even2" is 180°, the tracks Tr1, Tr3, and Tr5 can be identified.

The servo circuit 9 detects the phase difference of the reproduction signals of the positional regions "even1", "odd1", and "even2" so as to detect the position of the head, i.e., the track being scanned by the head.

Figure 6:
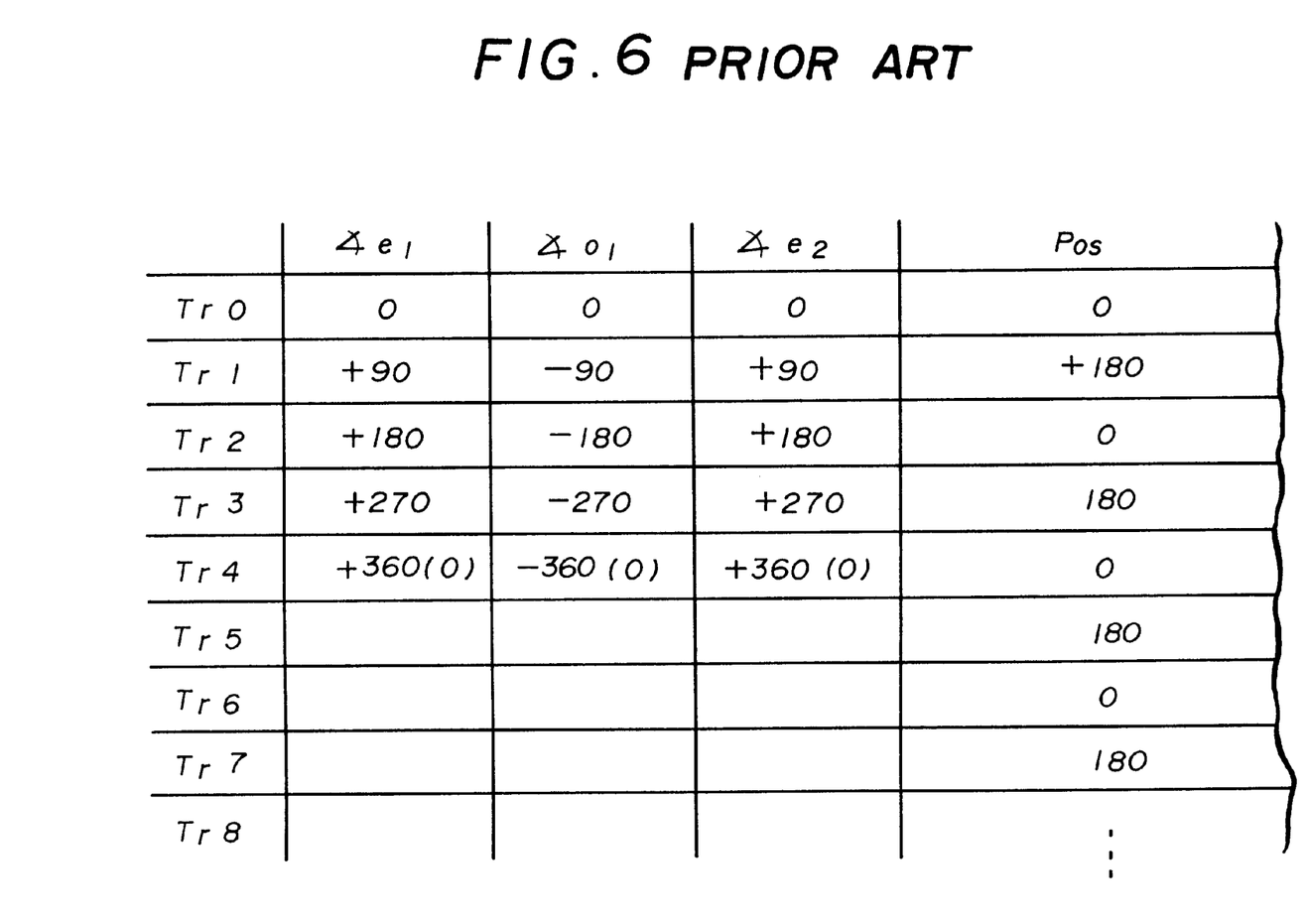
FIG. 6 shows an operation of the conventional magnetic disk device.

FIG. 6 shows an operation of the conventional magnetic disk device. The servo circuit 9 calculates the position (Pos) of the head from the formula:

$$Pos = (Pe1, Pe2) - Po1$$

wherein Pe1, Pe2, and Po1 are phase differences between detection signal and a predetermined track in the positional regions "even1", "odd1", and "even2", respectively, and (Pe1, Pe2) indicates the average value between Pe1 and Pe2.

As shown in FIG. 6, when the phases of the vectors e1, o1, and e2 are all 0°, the phase of the position of the head is 0°. Accordingly, it can be judged that the head is scanning the reference track When the head is scanning the track Tr1, which deviates from the reference track Tr0 by one track, the phase of the vector e1 is +90°, the phase of the vector o1 is −90°, and the phase of the vector e2 is +90°. Accordingly, the phase difference of Pos is +180°, and it can be judged that the head is situated on the track Tr1, which deviates from the reference track Tr0 by one track.

When the head is scanning the track Tr2, which deviates from the reference track Tr0 by two tracks, the phase of the vector e1 is +180°, the phase of the vector o1 is −180°, and the phase of the vector e2 is +180°. Accordingly, the phase difference of Pos becomes 0°. This cannot be distinguished from the phase difference of the reference track Tr0, and the head cannot be judged to be situated on the track Tr2.

When the head is scanning the track Tr3, which deviates from the reference track Tr0 by three tracks, the phase of the vector e1 is +270°, the phase of the vector o1 is −270°, and the phase of the vector e2 is +270°. Accordingly, the phase difference of Pos becomes 180°. This cannot be distinguished from the phase difference of the reference track Tr1, and the head cannot be judged to be situated on the track Tr3.

As described so far, the conventional servo circuit 9 can detect the position of the head only when the head deviates from the reference track Tr0 by one track.

Since the phase difference from the reference track is +90° or −90° in the positional regions of the conventional servo information, the positional information obtained from the phase difference is 0° or 180°, as shown in FIG. 6. From the positional information, only 1-track displacement can be detected. Because of this, when the head is greatly displaced from the reference track, the servomechanism cannot work properly.

SUMMARY OF THE INVENTION

A general object of the present invention is to provide a servo control method and an information storage device in which the above disadvantages are eliminated.

A more specific object of the present invention is to provide a servo control method and a magnetic disk device which can detect a wide range of displacement.

The above objects of the present invention are achieved by a servo control method and an information storage device in which servo control is performed in accordance with servo information including four positional regions having phase differences between tracks. One of the positional regions has a phase difference between tracks different from the other three positional regions. Thus, a plurality of tracks can be identified, and a wide range of displacement can be detected. Also, the servo control can be performed at high speed.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 7A:
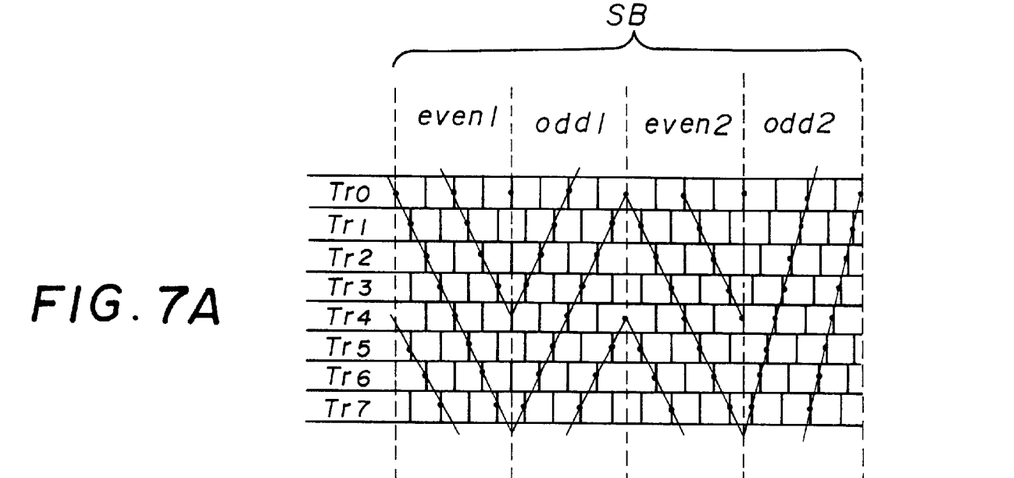
FIGS. 7A to 7I show a format of servo information of an embodiment of the present invention.

FIGS. 7A to 7I show a format of servo information of one embodiment of the present invention. FIG. 7A is a servo information format, and FIGS. 7B to 7I are reproduction signal waveforms of the respective tracks.

A magnetic disk device of this embodiment is the same as the device shown in FIG. 1.

Servo information SB stored on the magnetic disk 2 in advance has a fourth positional region "odd2" as well as the positional regions "even1", "odd1", and "even2" shown in FIG. 3.

In the fourth positional region "odd2", the phase difference among the tracks Tr0 to Tr7 is set at −135°, for instance. The phase difference is not limited to this, and it may also be −112.5°.

Figure 7B:
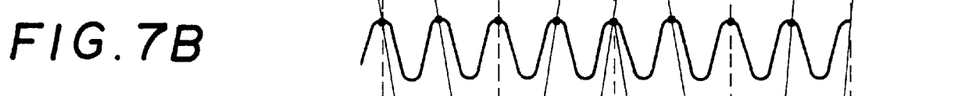
Figure 7C:
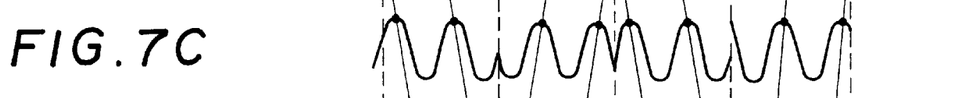
Figure 7D:
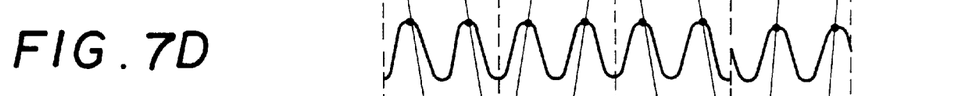
Figure 7E:
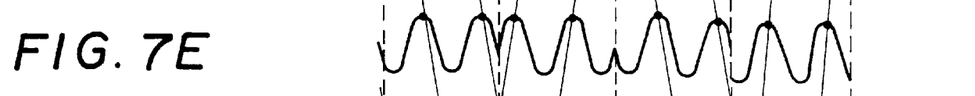
Figure 7F:
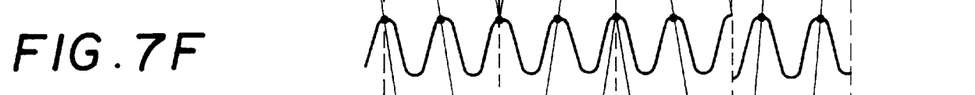
Figure 7G:
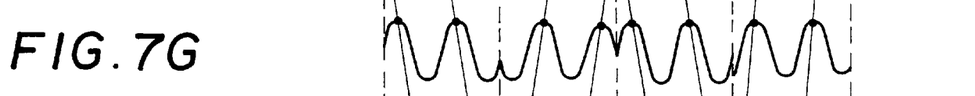
Figure 7H:
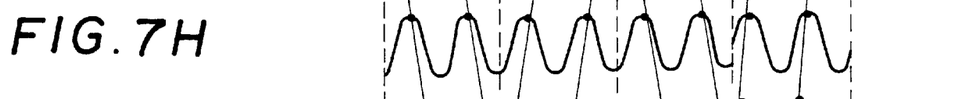
Figure 7I:
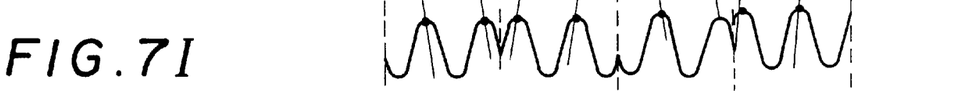

With the track Tr0 of FIG. 7B being the reference track and having a phase of 0°, the phase of the signal pattern is −135° on the track Tr1, −270° on the track Tr2, −405° (i.e., −45°) on the track Tr3, −540° (i.e., −180°) on the track Tr4, −675° (i.e., +45°) on the track Tr5, −810° (i.e., −90°) on the track Tr6, −945° (i.e., +135°) on the track Tr7, and −1080° (i.e., 0°) on the track Tr8.

Figure 8:
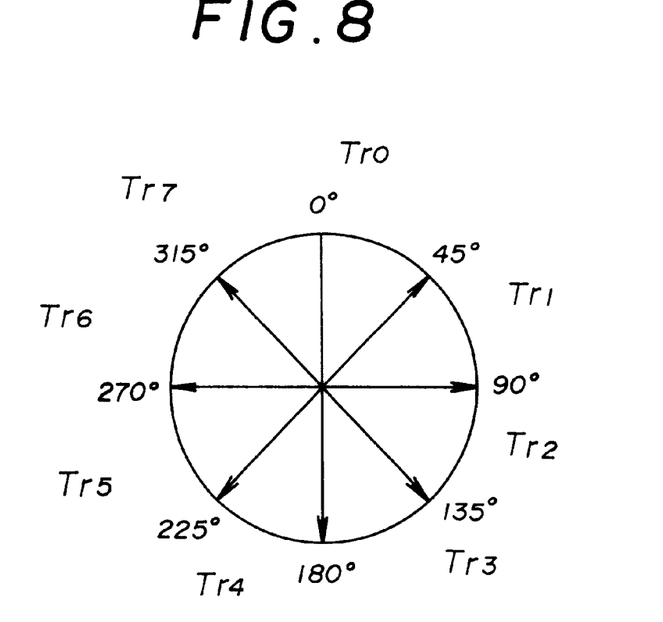
FIG. 8 shows an operation of the embodiment of the present invention.

FIG. 8 shows an operation of this embodiment. With the phase of the reference track Tr0 being 0°, the phase difference between the positional regions "odd1" and "odd2" is 45° on the track Tr1 displaced from the reference track Tr0 by one track, 90° on the track Tr2 displaced from the reference track Tr0 by two tracks, 135° on the track Tr3 displaced from the reference track Tr0 by three tracks, 180° on the track Tr4 displaced from the reference track Tr0 by four tracks, 225° on the track Tr5 displaced from the reference track Tr0 by five tracks, 270° on the track Tr6 displaced from the reference track Tr0 by six tracks, and 315° on the track Tr7 displaced from the reference track Tr0 by seven tracks.

Accordingly, it is possible to identify eight tracks, including the reference track Tr0, in accordance with the phase difference between the positional regions "odd1" and "odd2".

Figure 9:
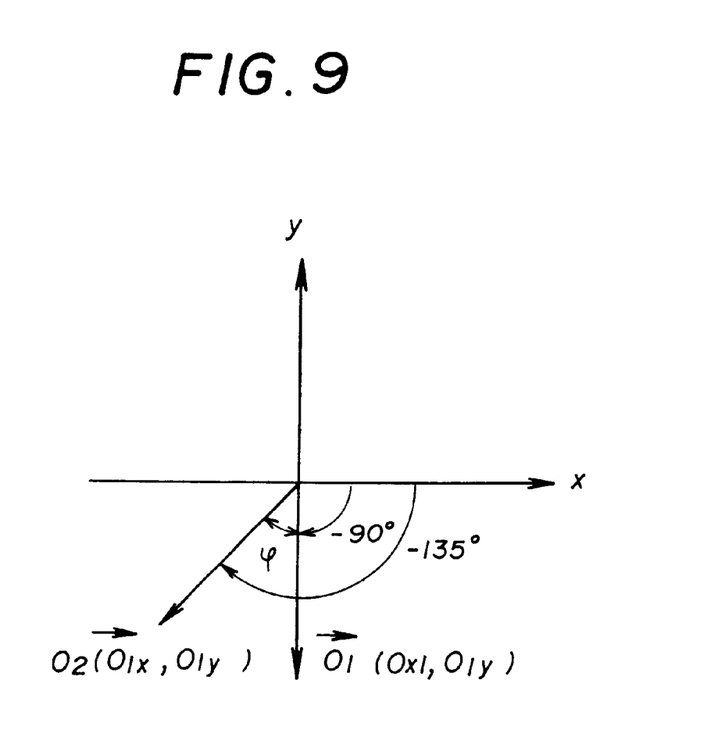
FIG. 9 shows the operation of the embodiment of the present invention.

FIG. 9 also shows the operation of this embodiment. The servo circuit 9 identifies the positional information Pos from the phase difference between vectors o1 and o2 of the positional regions "odd1" and "odd2", respectively.

When the phases of the vectors o1 and o2 are both 0° on the reference track Tr0, the phase difference between the vectors o1 and o2 is 0° on the reference track Tr0.

On the track Tr1, which deviates from the reference track Tr0 by one track, the phase of the vector o1 is −90°, and the phase of the vector o2 is −135°. Accordingly, the phase difference between the vectors o1 and o2 is +45° on the track Tr1.

On the track Tr2, which deviates from the reference track Tr0 by two tracks, the phase of the vector o1 is −180°, and the phase of the vector o2 is −270°. Accordingly, the phase difference between the vectors o1 and o2 is +90° on the track Tr2.

On the track Tr3, which deviates from the reference track Tr0 by three tracks, the phase of the vector o1 is −270°, and the phase of the vector o2 is −405°, i.e., −45°. Accordingly, the phase difference between the vectors o1 and o2 is +135° on the track Tr3.

On the track Tr4, which deviates from the reference track Tr0 by four tracks, the phase of the vector o1 is −360°, and the phase of the vector o2 is −540°, i.e., −180°. Accordingly, the phase difference between the vectors o1 and o2 is +180° on the track Tr4.

On the track Tr5, which deviates from the reference track Tr0 by five tracks, the phase of the vector o1 is −450°, i.e., −90°, and the phase of the vector o2 is −675°, i.e., +45°. Accordingly, the phase difference between the vectors o1 and o2 is −135° on the track Tr5.

On the track Tr6, which deviates from the reference track Tr0 by six tracks, the phase of the vector o1 is −540°, i.e., −180°, and the phase of the vector o2 is −810°, i.e., −90°. Accordingly, the phase difference between the vectors o1 and o2 is −90° on the track Tr6.

On the track Tr7, which deviates from the reference track Tr0 by seven tracks, the phase of the vector o1 is −630°, i.e., −270°, and the phase of the vector o2 is −945°, i.e., +135°. Accordingly, the phase difference between the vectors o1 and o2 is −45° on the track Tr7.

In the above manner, the eight tracks including the reference track Tr0 can be distinguished in accordance with the phase difference between the vectors o1 and o2.

However, there are velocity and time errors in the phase difference θ between the positional regions "odd1" and "odd2". Therefore, it is necessary to perform velocity correction and time correction.

The actual positional information Pos is calculated as follows.

A velocity correction element Ve is calculated from a difference between the velocity information obtained by the observer in the servo circuit 9 and the velocity information to be controlled. A time correction element T is detected from sin φ and cos φ of the phase difference φ between the positional regions "even1" and "even2".

Figure 10:
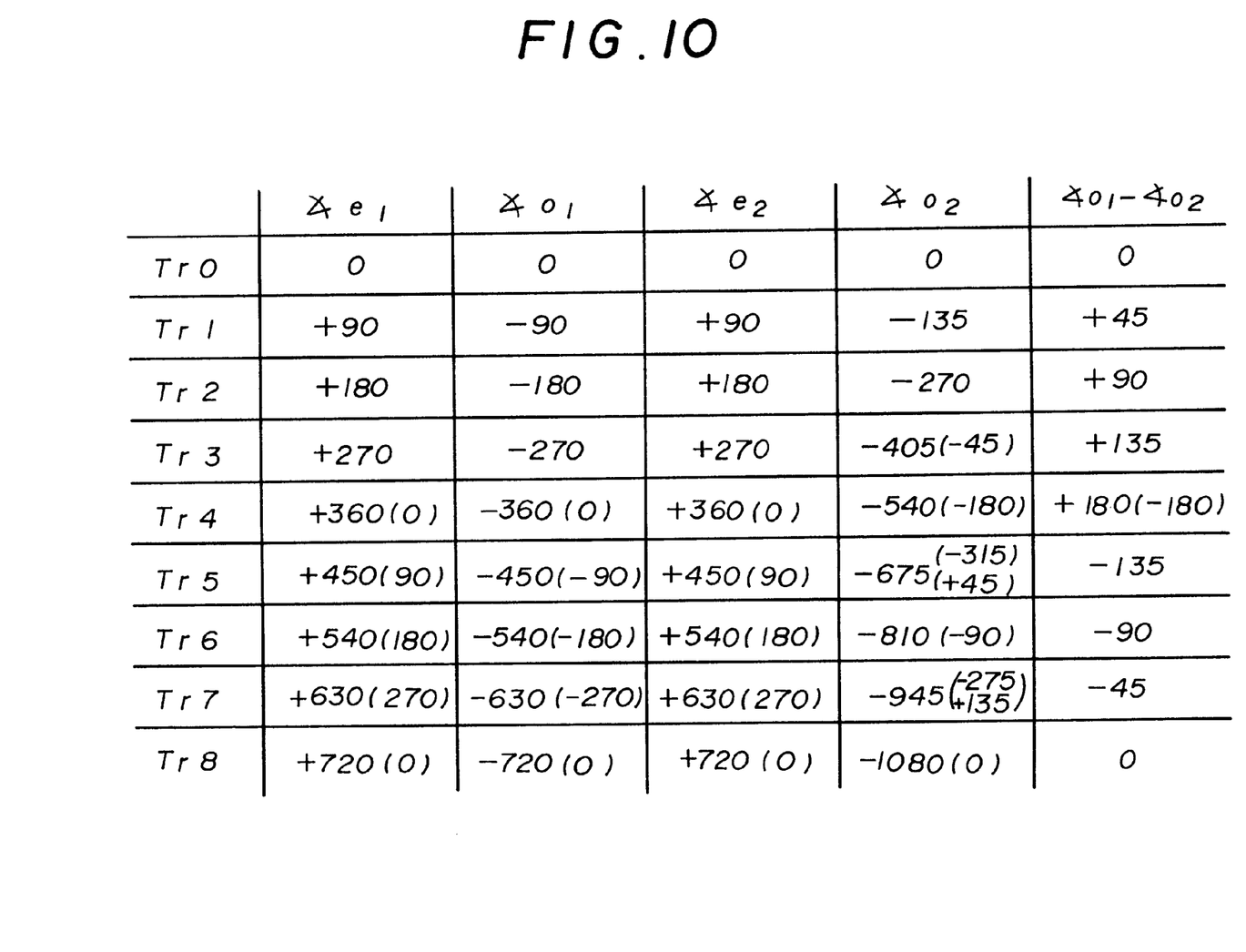
FIG. 10 shows the operation of the embodiment of the present invention.

FIG. 10 shows the operation of this embodiment. In FIG. 10, the vector indicating the phase of the positional region "even1" is e1, the vector indicating the phase of the positional region "even2" is e2, and the product of the magnitudes of e1 and e2 is r. With the phase difference between the vectors e1 and e2 being φ, sin φ and cos φ can be expressed as follows:

$$\sin\phi = \frac{e1 \times e2}{r}$$

$$\cos\phi = \frac{e1 \cdot e2}{r}$$

The matrix VeT of the velocity correction and time correction for the phase difference φ is expressed as follows:

$$VeT = \begin{pmatrix} \cos\phi & -\sin\phi \\ \sin\phi & \cos\phi \end{pmatrix} \quad (1)$$

The inverse matrix $VeT^{-1}$ of the matrix VeT is determined from the equation (1) as follows:

$$VeT^{-1} = \begin{pmatrix} \cos\phi & \sin\phi \\ -\sin\phi & \cos\phi \end{pmatrix} \quad (2)$$

Here, the inverse matrix $T^{-1}$ of the time correction is expressed as follows:

$$T^{-1} = Ve \cdot VeT^{-1} = Ve \cdot Ve^{-1} \cdot T^{-1} \quad (3)$$

The inverse matrix $T^{-1}$ is determined by substituting the velocity correction element Ve and the equation (2) in the equation (3).

The relationship between the positional regions "odd1" and "odd2" is expressed as follows:

$$o2 = T \cdot Vo \cdot Pos \cdot o1 \quad (4)$$

In the equation (4), T is the time correction element; Vo is the velocity correction element; Pos is the positional information; and o1 and o2 are the vectors of the positional regions "odd1" and "odd2".

With the phase difference between the positional regions "odd1" and "odd2" being θ, sin θ and cos θ are expressed as follows:

$$\sin\theta = \frac{o1 \times o2}{r} \quad (5)$$

$$\cos\theta = \frac{o1 \cdot o2}{r}$$

From the equation (5), T·Vo·Pos is expressed as follows:

$$T \cdot Vo \cdot Pos = \begin{pmatrix} \cos\theta & \sin\theta \\ -\sin\theta & \cos\theta \end{pmatrix} \quad (6)$$

The positional information Pos is determined by multiplying the equation (6) by the inverse matrix of the velocity correction and the inverse matrix of the time correction:

$$Pos = Vo^{-1} \cdot T^{-1} \begin{pmatrix} \cos\theta & \sin\theta \\ -\sin\theta & \cos\theta \end{pmatrix} \quad (7)$$

Here, the equation (3) is substituted in the equation (7) as follows:

$$Pos = Vo^{-1} \cdot Ve \cdot VeT^{-1} \begin{pmatrix} \cos\theta & \sin\theta \\ -\sin\theta & \cos\theta \end{pmatrix} \quad (8)$$

The positional information Pos is demodulated by the equation (8).

In the above manner, 8-track recognition becomes possible by the addition of the positional region "odd2" whose phase difference between the tracks is −135°.

Figure 11:
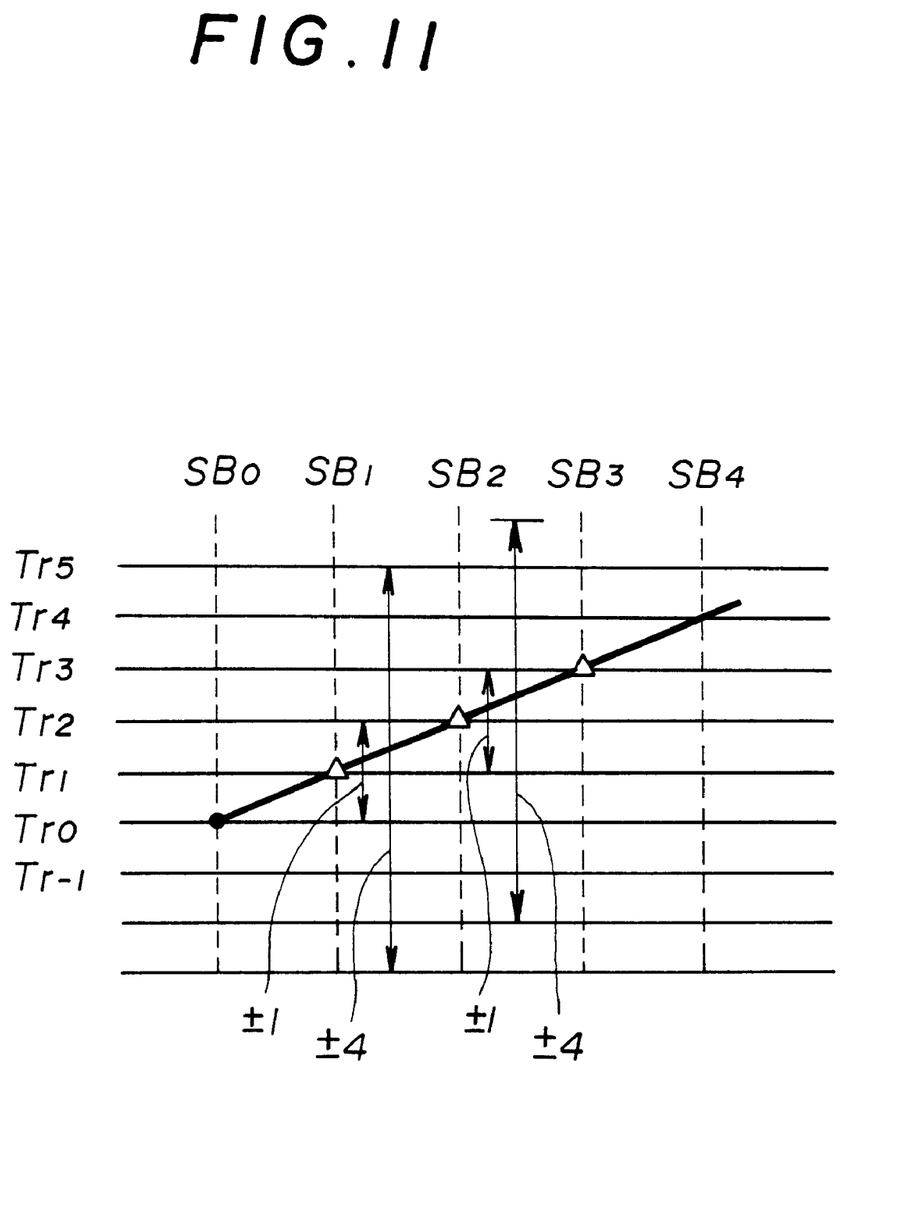
FIG. 11 shows the operation of the embodiment of the present invention.

FIG. 11 shows the operation of this embodiment. When the magnetic head 4 scans, only 1-track displacement can be detected in the prior art. In this embodiment, a wide range of displacement can be detected in accordance with the servo information SB0 to SB4. Even if the magnetic head 4 is deviated by vibration, the position of the head 4 is easily detected, so that the magnetic head 4 can be immediately returned to the original position.

In the above-described embodiment, the magnetic disk device is employed, but the present invention can also be applied to an optical disk or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The present application is based on Japanese priority application No. 10-340556, filed on Nov. 30, 1998, the entire contents of which are hereby incorporated by reference.

What is claimed is:

1. A servo control method comprising the steps of:
   reproducing servo information comprising a plurality of positional regions having phase differences between tracks, the positional regions being disposed in a scanning direction of a head; and
   performing servo control in accordance with the reproduced servo information,
   wherein one of the positional regions has a phase difference between tracks different from phase differences between tracks of the other positional regions.

2. The servo control method according to claim 1, wherein:
   the positional regions include a first positional region, a second positional region, a third positional region, and a fourth positional region;
   the phase difference between tracks in the first positional region is +90°;
   the phase difference between tracks in the second positional region is −90°;
   the phase difference between tracks in the third positional region is +90°; and
   the phase difference between tracks in the fourth positional region is not 90°.

3. The servo control method according to claim 2, wherein the phase difference between the tracks in the fourth positional region is −135°.

4. The servo control method according to claim 2, wherein the phase difference between the tracks in the fourth positional region is −112.5°.

5. The servo control method according to claim 1, further comprising the step of detecting a position of the head from a phase difference of a reproduction signal of a detected one of the positional regions.

6. The servo control method according to claim 1, wherein a detection signal of a position of the head includes a velocity correction value and a time correction value.

7. An information storage device comprising:
   a recording medium;
   a head which scans the recording medium; and
   a plurality of positional regions arranged on the recording medium in a scanning direction of the head, the positional regions having phase differences between tracks,
   wherein one of the positional regions has a phase difference between tracks different from phase differences between tracks of the other positional regions.

8. The information storage device according to claim 7, wherein:
   the positional regions recorded on the recording medium in advance include a first positional region, a second positional region, a third positional region, and a fourth positional region;
   the phase difference between tracks in the first positional region is +90°;
   the phase difference between tracks in the second positional region is −90°;
   the phase difference between tracks in the third positional region is +90°; and
   the phase difference between tracks in the fourth positional region is not 90°.

9. The information storage device according to claim 8, wherein the phase difference between the tracks in the fourth positional region is −135°.

10. The information storage device according to claim 8, wherein the phase difference between the tracks in the fourth positional region is −112.5°.

11. The information storage device according to claim 7, further comprising a position detector which detects a position of the head in accordance with a phase difference of a reproduction signal of a detected one of the positional regions.

12. The information storage device according to claim 11, wherein a detection signal of the position of the head detected by the position detector includes a velocity correction value and a time correction value.

* * * * *